Jan. 27, 1970  D. H. FRAZIER  3,491,647
SPACER
Filed March 18, 1968

INVENTOR.
DALLAS H. FRAZIER
BY
ATTORNEY

3,491,647
SPACER
Dallas H. Frazier, 1609 S. Linwood Ave.,
Evansville, Ind. 62242
Filed Mar. 18, 1968, Ser. No. 713,970
Int. Cl. F16b 43/00
U.S. Cl. 85—51                                    1 Claim

ABSTRACT OF THE DISCLOSURE

A spacer characterized by two components with the same overall configuration and having inclined cooperating faces, each with a projecting portion for locking purposes when assembled.

---

The need for a spacer which can be readily mass produced and, at the same time, easy to install and effective in end results is widespread. The usage of such type of device is various and extensive, including, by way of example, as a replacement for a worn part of machinery, precluding any necessity of machine disassembly; the tightening of a coil spring, where the latter has lost part of its resilient properties; as a wedge, for an unlimited number of purposes; and, as a lockwasher, when so modified for such purpose.

The invention provides a unique approach to the aforedescribed representative end uses. In this connection, and briefly, the invention comprises two parts, each part being identical to the other. In assembly, the parts are reversed, so that inclined cooperating mating surfaces are positively locked together, and where further proper orientation is achieved through projections which extend into channels which open into a passageway through the center of the spacer. The invention is readily used for positive action, and because of its simplicity in structure, lends itself to manufacturing economies.

A better understanding of the invention will become more apparent from the following description, taken in conjunction with the accompanying drawing, wherein FIG. 1 is a top plan view of one of the components defining the invention;

Figure 1:
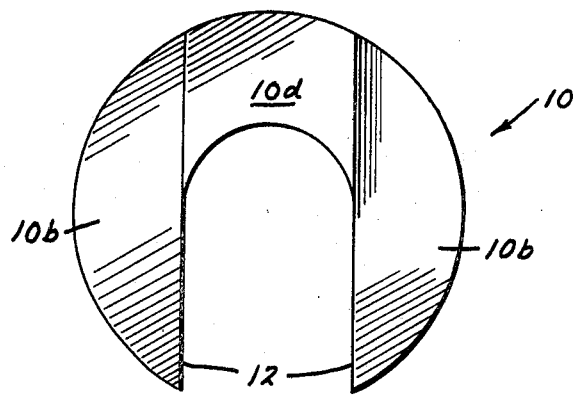
Figure 2:
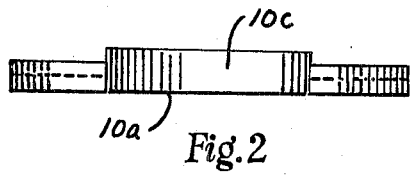
FIG. 2 is a view in elevation of the spacer of FIG. 1, looking from front to back of such figure.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
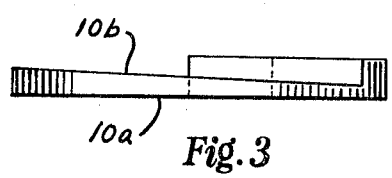
FIG. 3 is a view in side elevation of the spacer of FIGS. 1 and 2.

Referring now to the figures, the invention is defined by two identical elements or components 10 and 10', inverted with respect to each other for assembly. Each component is defined as having a generally flat outer bearing surface 10a–10a', where an inner bearing surface 10b–10b' is inclined downwardly from front to back (see FIG. 3).

A channel 12 is provided in each component 10 and 10', communicating from an outer edge to an axially disposed opening 14. A projecting portion 10c–10c', having a generally flat top surface 10d–10d', extends upwardly from a portion of each inner bearing surface 10b–10b'. The top surface 10d–10d' of each projecting portion 10c–10c' defines an overall flat surface, when assembled, with the outer bearing surface 10a–10a'. The aforesaid axial opening 14, provided in a typical invention embodiment, permits the introduction of the invention to a position around a shaft or the like (not shown).

While the invention may be made from various types of material, where a non-elastic material is employed, the side edges of the channel 12 are parallel and of the same diameter as the axial opening 14. In the instance where an elastic material is employed, the mouth of the channel 12 may be spaced closer than the diameter of the axial opening 14, with the sides diverging to such axial opening 14, or the sides made to remain parallel but closer together than the diameter of the axial opening 14. In the former event, the shape of the projecting portion 10c–10c' would be correspondingly changed. In any event, the preceding affords a snugness as the shaft passes along the channel 12 and before it reaches the axial opening 14.

Figure 4:
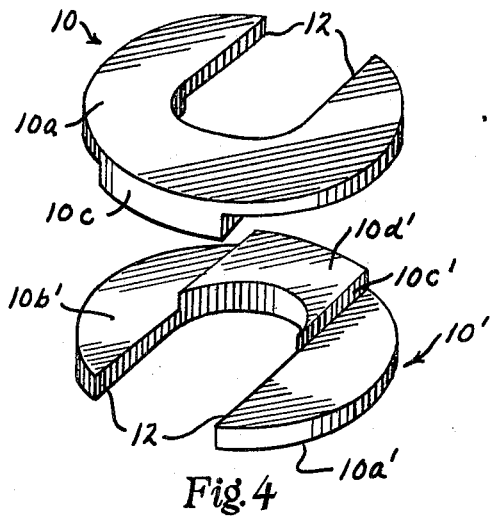
FIG. 4 is an exploded perspective view of the invention prior to assembly.
Figure 5:
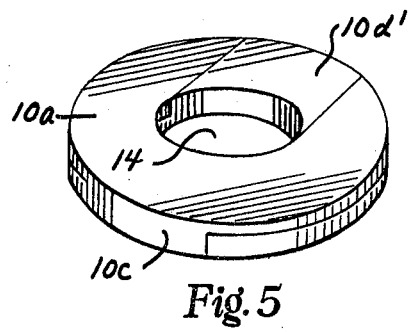
FIG. 5 shows an assembled spacer in accordance with the invention.

In use, and with particular reference to FIGS. 4 and 5, the components 10–10' are inverted with respect to each other and, for example, component 10' slipped into position around the shaft in the equipment under repair. The shaft then extends through the axial opening 14 in component 10', and, thereafter, component 10 is moved into position, so that the projecting portion 10c moves along the channel 12 of component 10'. Such projecting portions 10c–10c' serve to assist locking action and prevent rotational displacement between the components 10 and 10'.

When assembled, with inclined inner bearing surfaces 10b–10b' cooperating with each other in reverse wedging action, the outer bearing surfaces 10–10a' also serve to achieve the desired overall spacer functions. In other words, and as should be apparent from the drawing, through the use of two identical components, a positive acting spacer is achieved, which is not only simple to manufacture, but represents ease in installation.

As a matter of illustration, an aside from the usual spacing functions, the invention may be used as a wedge, or even as a lockwasher when modified to include upturned or downturned ends. Additionally, certain types of epoxy rosins may be employed to form each component, combining to afford a strong overall unit. Moreover, surfaces of the spacer may be knurled for specialized end purposes.

Thus, it should be understood that the spacer described above is susceptible to various changes within the spirit of the invention, and that the description should be considered illustrative, and not as limiting the scope of the following claim:

I claim:

1. A two-part spacer, one part being identical with the other part and each comprising a generally flat outer bearing surface, an inclined inner bearing surface, an axial opening defining a smooth, substantially semi-cylindrical wall, and a channel extending from an outer edge of the part and communicating with said axial opening, said inclined inner bearing surface tapering from said outer edge defining the mouth of said channel to the diametrically opposed edge of said part, whereby the thickness of each of the parts uniformly decreases from said outer edge to said diametrically opposed edge, a projection extending upwardly from said inclined inner bearing surface opposite the mouth of said channel, said projection in one part being positioned within said channel in the other part, and the top surface of said projection being in substantially the same plane as the outer bearing surface in said other part.

References Cited

UNITED STATES PATENTS

| | | | |
|---|---|---|---|
| 1,452,492 | 4/1923 | Carpenter | 85—51 |
| 1,662,094 | 3/1928 | Wesp | 85—51 |
| 2,236,130 | 3/1941 | Betebenner | 85—8.8 |

FOREIGN PATENTS

| | | |
|---|---|---|
| 1,206,231 | 8/1959 | France. |
| 723,028 | 7/1942 | Germany. |
| 255,354 | 10/1959 | Australia. |

RAMON S. BRITTS, Primary Examiner